United States Patent
Mehedy et al.

(10) Patent No.: US 10,360,224 B2
(45) Date of Patent: Jul. 23, 2019

(54) IMAGE AND DATA CAPTURE AND MACHINE LEARNING FOR AUTOMATIC GENERATION OF SEARCH QUERIES

(71) Applicant: International Business Machines Corporation, Armonk, NY (US)

(72) Inventors: Lenin Mehedy, Doncaster East (AU); Stefan von Cavallar, Sandringham (AU); Nicholas I. Waywood, Melbourne (AU)

(73) Assignee: International Business Machines Corporation, Armonk, NY (US)

(*) Notice: Subject to any disclaimer, the term of this patent is extended or adjusted under 35 U.S.C. 154(b) by 594 days.

(21) Appl. No.: 15/082,175

(22) Filed: Mar. 28, 2016

(65) Prior Publication Data

US 2017/0277693 A1  Sep. 28, 2017

(51) Int. Cl.

| | |
|---|---|
| *G06F 17/30* | (2006.01) |
| *G06F 16/2457* | (2019.01) |
| *G06N 20/00* | (2019.01) |
| *G06F 16/248* | (2019.01) |
| *G06F 16/532* | (2019.01) |
| *G06Q 10/10* | (2012.01) |
| *G06F 16/9032* | (2019.01) |
| *G06F 16/903* | (2019.01) |

(52) U.S. Cl.
CPC ...... *G06F 16/24578* (2019.01); *G06F 16/248* (2019.01); *G06F 16/532* (2019.01); *G06F 16/9032* (2019.01); *G06F 16/90335* (2019.01); *G06N 20/00* (2019.01); *G06Q 10/10* (2013.01)

(58) Field of Classification Search
CPC .......... G06F 17/3053; G06F 17/30554; G06F 16/24578; G06F 16/9032; G06F 16/90335; G06F 16/532; G06F 16/248; G06N 99/005; G06N 20/00
See application file for complete search history.

(56) References Cited

U.S. PATENT DOCUMENTS

| | | | |
|---|---|---|---|
| 2007/0106659 A1* | 5/2007 | Lu | G06F 17/30554 |
| 2008/0082497 A1* | 4/2008 | Leblang | G06F 16/58 |

(Continued)

OTHER PUBLICATIONS

Conceptboard, https://conceptboard.com/, Printed on Mar. 21, 2016, 7 pages.

(Continued)

*Primary Examiner* — Jared M Bibbee
(74) *Attorney, Agent, or Firm* — Scully, Scott, Murphy & Presser, P.C.; Grant Johnson

(57) ABSTRACT

Automatically capturing information and performing content searching may include extracting features from data content, for example, captured via an image capturing device or by another method. Features extracted from the data content are structured into an ontology graph representing keywords and contextual relationships. Search queries are generated based on the ontology graph, by inputting the ontology graph to a query generating machine learning model trained to predict one or more search queries. The search queries are executed and one or more search results are presented on a user interface, for example, a display device. Based on received feedback on the search results, the machine learning model is retrained.

20 Claims, 9 Drawing Sheets

(56) References Cited

U.S. PATENT DOCUMENTS

| | | | | |
|---|---|---|---|---|
| 2010/0145982 A1* | 6/2010 | Iwase | ................... | G06F 3/0488 |
| | | | | 707/769 |
| 2011/0078187 A1* | 3/2011 | Lim | ................. | G06F 17/30404 |
| | | | | 707/772 |
| 2011/0149101 A1* | 6/2011 | Kim | ................... | G06K 9/00449 |
| | | | | 348/222.1 |
| 2015/0347585 A1* | 12/2015 | Klotz | ............... | G06F 17/30867 |
| | | | | 707/706 |
| 2016/0034463 A1* | 2/2016 | Brewer | ................. | H04L 43/12 |
| | | | | 707/734 |
| 2017/0097939 A1* | 4/2017 | Zhu | ..................... | G06F 17/3097 |
| 2018/0253469 A1* | 9/2018 | Shapira | ............ | G06F 17/30365 |

OTHER PUBLICATIONS

Podio, https://podio.com/site, Printed on Mar. 21, 2016, 5 pages.
Producteev, https://www.producteev.com/, Printed on Mar. 21, 2016, 5 pages.
Redbooth, https://redbooth.com/, Printed on Mar. 21, 2016, 9 pages.
Trello, https://trello.com/, Printed on Mar. 21, 2016, 5 pages.
Wiggio, https://wiggio.com/#tpl=home_0, Printed on Mar. 21, 2016, 1 page.

\* cited by examiner

IMAGE AND DATA CAPTURE AND MACHINE LEARNING FOR AUTOMATIC GENERATION OF SEARCH QUERIES

FIELD

The present application relates generally to computers and computer applications, and more particularly to data such as image capturing and processing, automatic machine learning and automatic generation of search queries and invoking searches, for example, via a search engine.

BACKGROUND

Actions such as writing task lists, drawing diagrams, writing idea sensitive keywords, and general brainstorming generally occur during phases of project planning and idea exploration. Such activities may be extremely agile and may involve many iterative updates to information. Often, those activities take place on convenient apparatuses such as a whiteboard, and information content from such activities need to be shared between collaborators, for example, immediately after the meeting or soon thereafter. Sharing may be required through channels such as email, blog, wiki, project planning or task planning software, and file store, and/or other medium.

The information that is shared, however, may require further investigation be performed at a later point in time. Such investigation may be translated to a required task or action to be carried out by someone. The task to be investigated can often require significant investment in time, for example, in searching for relevant information that then might need to be filtered, collated and structured. Further, this information can relate to one or more single or intersecting domain areas, and a person given the task may not be familiar within these domains. For instance, collaborators often have varying levels of domain expertise applicable to the collaboration effort being carried out.

BRIEF SUMMARY

A computer-implemented method and system of automatically capturing information and performing content searching may be provided. The method, one aspect, may include receiving captured data content that is generated during a work session. The method may also include processing the data content to extract features, the features comprising at least keywords and context. The method may also include structuring the features into an ontology graph representing the keywords and contextual relationships. The method may further include generating one or more search queries based on the ontology graph, by inputting the ontology graph to a query generating machine learning model trained to predict the one or more search queries. The method may further include executing the one or more search queries. The method may also include providing via a user interface device one or more search results of the one or more search queries. The method may also include receiving feedback on the one or more search results. The method may further include tagging the one or more search results with weights based on the feedback. The method may also include retraining the query generating machine learning model based on the tagged one or more search results.

A system of automatically capturing information and performing content searching, in one aspect, may include one or more hardware processors coupled to a storage device. One or more of the hardware processors may be operable to receive captured data content that is generated during a work session from the storage device. One or more of the hardware processors may be further operable to process the data content to extract features, the features comprising at least keywords and context. One or more of the hardware processors may be further operable to structure the features into an ontology graph representing the keywords and contextual relationships. One or more of the hardware processors may be further operable to generate one or more search queries based on the ontology graph, by inputting the ontology graph to a query generating machine learning model trained to predict the one or more search queries. One or more of the hardware processors may be further operable to execute the one or more search queries. One or more of the hardware processors may be further operable to provide via a user interface device one or more search results of the one or more search queries. One or more of the hardware processors may be further operable to receive feedback on the one or more search results. One or more of the hardware processors may be further operable to tag the one or more search results with weights based on the feedback. One or more of the hardware processors may be further operable to retrain the query generating machine learning model based on the tagged one or more search results.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method, and techniques may be provided that can perform background searching for relevant and tailored content related to a collaborative work, for example, in real-time for a project currently being collaborated, or at a later point in time. The system, method, and techniques in one aspect may automatically capture data such as text and image generated during a collaborative process, for example, captured from an image capture device, directly from collaborative tools being used, and/or from another channel such as a database, and/or other sources. In another aspect, the system and/or method of the present disclosure performs searching and aggregation of resources autonomously.

In one embodiment, the system and/or method, for example, may incorporate image and text analytics coupled with cognitive learning and tailored content searching, for example, to assist users during project planning, idea exploration and scoping phases. The system and/or method in one embodiment may provide for collaborative sharing of project data and ideas; conversion of project lists, diagrams, and/or other, to a digital form, using image and text analytics; and automated analysis and interpretation of project data and storage of those information, for example, for later reference; and automated content searching for tailored content relevant to the project.

The system and/or method of the present disclosure in one embodiment may integrate various mobile computing and web services including cognitive, social, cloud and analytics. A system in one embodiment of the present disclosure may include a mobile image capture device, an interface for users to interact with the system and, for example, a computer-implemented service such as a cloud service which provides the cognitive and analytical capabilities of the system.

Figure 1:
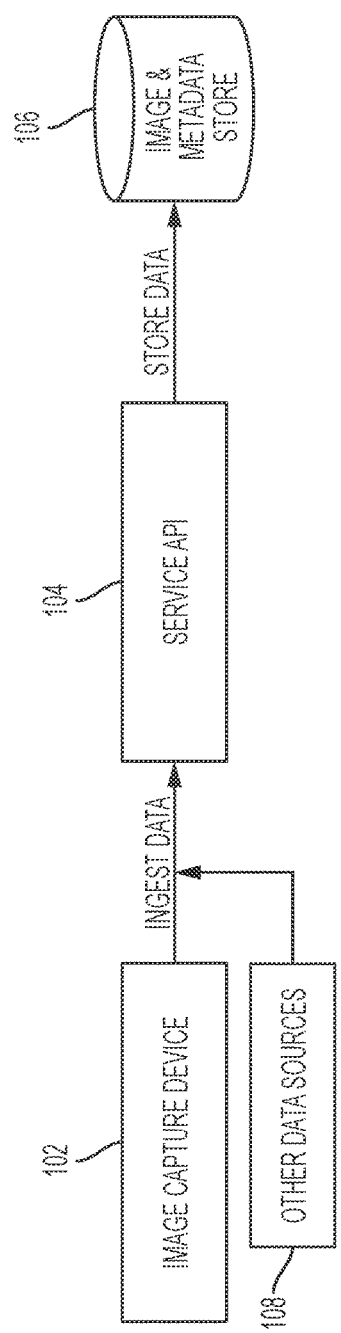
FIG. 1 illustrates components of a system that capture data and extract features from the data in one embodiment of the present disclosure.

FIGS. 1-4 illustrate components and process flow of a system in one embodiment of the present disclosure. FIG. 1 illustrates components of a system that capture data and extract features from the data in one embodiment of the present disclosure. The components may execute on or include one or more hardware processors that perform the functionalities of the components. The system in one embodiment may include an image capture device 102, for example, a mobile image capture device that may capture images of information generated during a project session, for example, a collaborative meeting session.

A service application programming interface (API) 104 may receive the captured data from the information capturing device 102 and store processed information in an image and metadata store or database 106. The service API 104 may be also communicatively and/or operatively coupled to other data source, for example, collaborative tool or others 108, for instance, being used during project collaboration session, from which the service API 104 may directly receive data or information generated or discussed, e.g., during the collaboration session.

Figure 6:
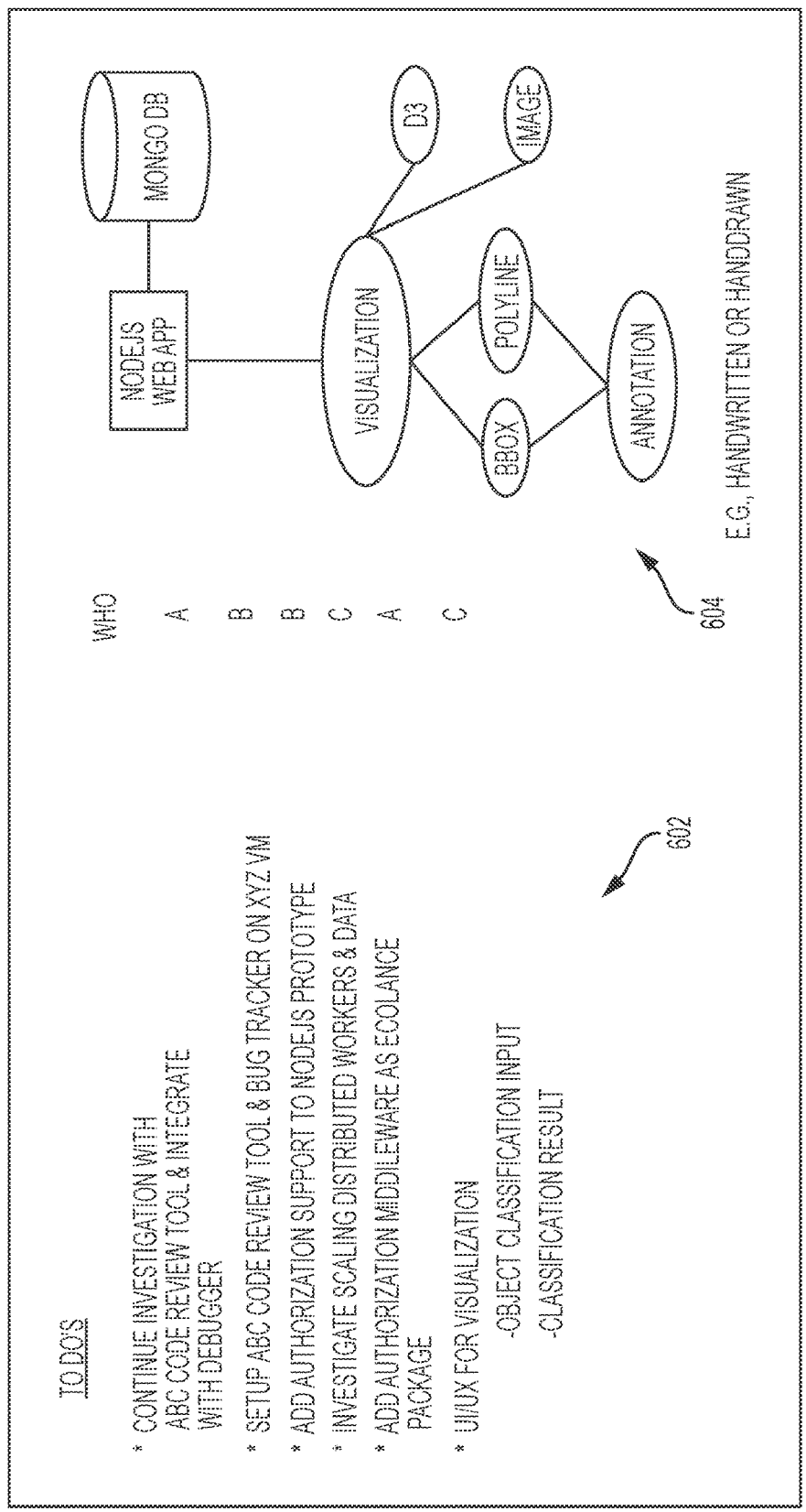
FIG. 6 shows an example source for data capture, in one embodiment of the present disclosure.

The system in one embodiment may collect input data from various sources. An example of a source is handwritten and/or hand drawn content from a surface such as a whiteboard. An example of such whiteboard content is shown in FIG. 6. For instance, content may include text, diagrams, lists, pictures or other types. Capturing of this project data may be performed by an apparatus or device 102 capable of capturing images such as a portable device with an attached or integrated camera. Examples of such apparatus or device may include, but are not limited to, a smartphone, a portable computer with a connected web-cam (e.g., Raspberry Pi from Raspberry Pi Foundation, United Kingdom) and other devices.

In one embodiment, the content that is captured may be processed by the image capture device 102 and stored in a storage device 106 via a service API 104. The processed data may be sent to a networked stand-alone or cloud-based system for further analytics processing. The content capture apparatus or device 102 may perform processing to extract features or information such as, but not limited to, text from image, flow/line diagram from image, picture from image, lists from image, location-based information, inference from text, inferred context of project data, history of changes. In one aspect, the history of changes may be maintained. One or more of, or all of such features may be extracted.

Input data to a system of the present disclosure, used for cognitive project planning, idea exploration and scoping, may vary widely. For example, data may be captured from an image capture device 102, but the system of the present disclosure does not preclude using other data sources. For example, in another embodiment, the input data source may be ingested from other sources 108, for example, online collaboration tools and/or services, speech, voice, audio source, social network systems or servers, communication services or server such as instant messaging, electronic-mail (email), and/or others. For example, data may be capture or ingested, for example, as images and/or text from an electronic whiteboarding or meeting tool. Yet in another aspect, screen capture tools may be employed to capture data such as images and text.

Content ingested from these sources may include, but are not limited to, text, diagrams, lists, pictures and/or other types. The types of features extracted from the ingested data may include, but are not limited to: text, lists, digital diagrams, photos, social media posts, flow/line diagram from an image, location-based information, inference from text, inferring context of project data, maintained history of changes, communication message thread (for example, email or instant messaging thread). Once captured or ingested, the content may be processed, and stored at 106. The content may be also sent to a system or subsystem for further processing. In one embodiment, capture data may be processed (e.g., for feature extraction) by the capture device. In another embodiment, the captured or ingested data may be processed by an analytics component responsive to receiving the data.

Figure 2:
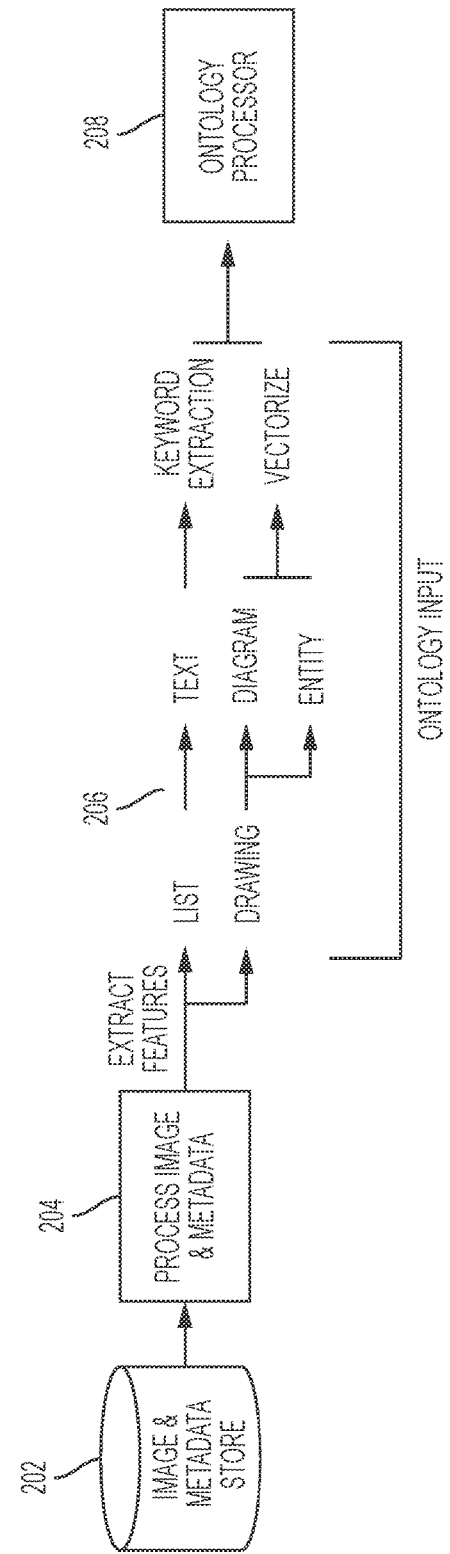
FIG. 2 shows components of a system in one embodiment of the present disclosure that further process the information content.

FIG. 2 shows components of a system in one embodiment of the present disclosure that further process the information content. The components may execute on one or more hardware processors. Image and metadata store 202 stores the information content captured, for example, as shown and described with reference to FIG. 1. An image and metadata processing component or processor 204 may further process the collated content received from the image and metadata store 202, to extract more relevant features such as, but not limited to, keywords, context, ontology, relevancy or concept, location, and/or others 206, and to structure the extracted features appropriate to input into an ontology processor 208, for machine-learning and content searching processing. One or more techniques may be employed for extracting or generating items such as context and ontology. For example, keywords may be extracted and used to further infer the context of the input data or captured data. Keywords, for example, may be extracted using a text analytics vectorization method. Other techniques may be employed for determining context. The terms, keywords and context keywords are used interchangeably. For generating ontology, for example, the result of natural language processing may store identified keywords associated by context relationships represented by a graph network. The image and metadata store 202, process image and metadata 204 component, and the ontology processor 208 may be a cloud-based system in one embodiment of the present disclosure.

Figure 3:
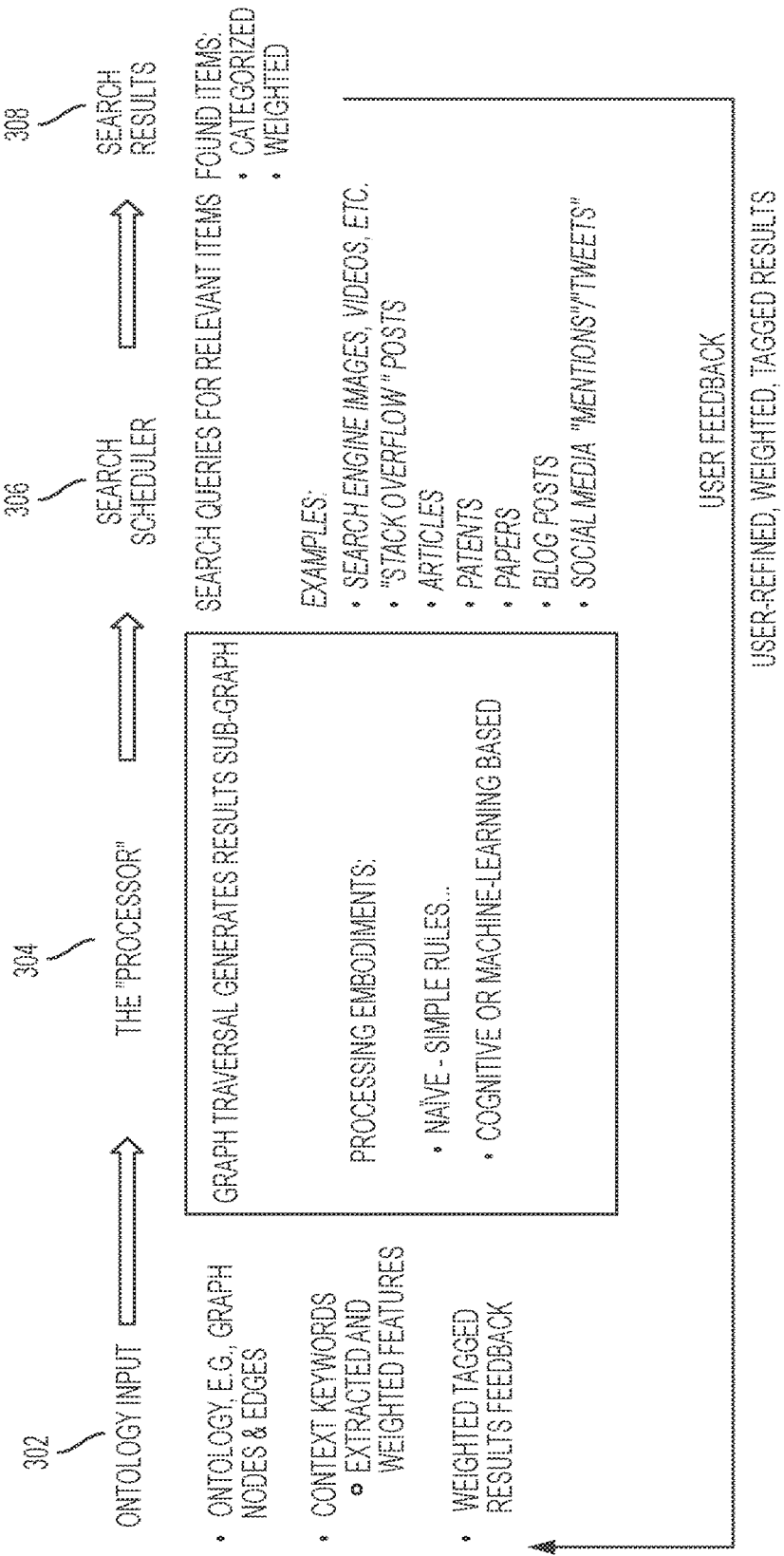
FIG. 3 is a diagram illustrating an ontology processor in one embodiment of the present disclosure.

FIG. 3 is a diagram illustrating an ontology processor in one embodiment of the present disclosure. The components may execute on one or more hardware processors. The ontology processor 304 in one embodiment is a real-time background process that performs further analysis and searches based on the collated and structure relevant keywords and data 302, to find resources and content relevant to the original input data. The collated and structure relevant keywords, for example, are generated by the process image and metadata component shown in FIGS. 2 and 204, and may be received by the ontology processors, for example, represented as an ontology graph. The ontology processor's process is a continuous and autonomous process that receives input, automatically generates relevant items for search queries, automatically learns to improve its process of generating the relevant items for search queries based on feedback received as input. The feedback in one embodiment of the present disclosure includes weighted search results, the search results generated from executing the search queries based on the ontology processor 304 generated relevant items.

For example, the ontology processor 304 receives as input, the generated ontology 302 represented by a graph of nodes comprising keywords (context keywords) and edges representing context relationships or associations between the keywords. For instance, a node in the graph contains a context keyword and an edge between the nodes contains an extracted and weighted feature value. A node may also have an extracted and weighted feature value associated with the node. An example of a weighted feature value associated with a node may include or may be determined based on the frequency of occurrence of a keyword represented by the node in the captured or ingested data content. For example, higher frequency of occurrences results in a higher weighting of the node. An example of an extracted and weighted feature value of an edge between two nodes may include or may be determined based on the frequency of keywords represented by the two nodes appearing together, for example, within a threshold number of words in text, or for example, the distance between the keywords appearing in image data, for example, pixel distance. The ontology processor 304 in one embodiment may traverse the ontology graph and based on the ontology graph and the context keywords, the ontology processor 304 may generate a result sub-graph comprising relevant items. For instance, to generate the result sub-graph, the ontology graph may be pruned based on the weighting of the nodes and edges. The relevant items associated with the nodes of the sub-graph may be identified or determined by executing a text analytics semantic query on a knowledgebase to identify items associated with the nodes (e.g., keywords represented by the nodes). An example of a knowledgebase may include, but not limited to, a database of information, for example, generated from crowd-sourced community. Other knowledgebase may be employed. For a knowledgebase that is structured as a graph of nodes, relevant items may be extracted directly from the nodes in such knowledgebase.

Based on the items determined to be relevant that are automatically generated by the ontology processor 304, a search may be performed, for example, by automatically executing a search engine, for example, as shown at 306. A search engine, for example, takes in search queries and performs a search on one or more databases or repositories. In one embodiment, a search engine may be an Internet search engine that crawls or otherwise searches data available over the Internet. The search results generated from the search may be categorized and weighted as shown at 308. User feedback, for example, may be received and used to generate weights to associate with the results. The results may be tagged with weights and fed back to the ontology processor 304 as input as shown at 302. The ontology processor 304 may further execute one or more cognitive or machine-learning based algorithms to further learn and correct its process of generating the result sub-graph, for example, based on feedback (e.g., weighted results).

Figure 4:
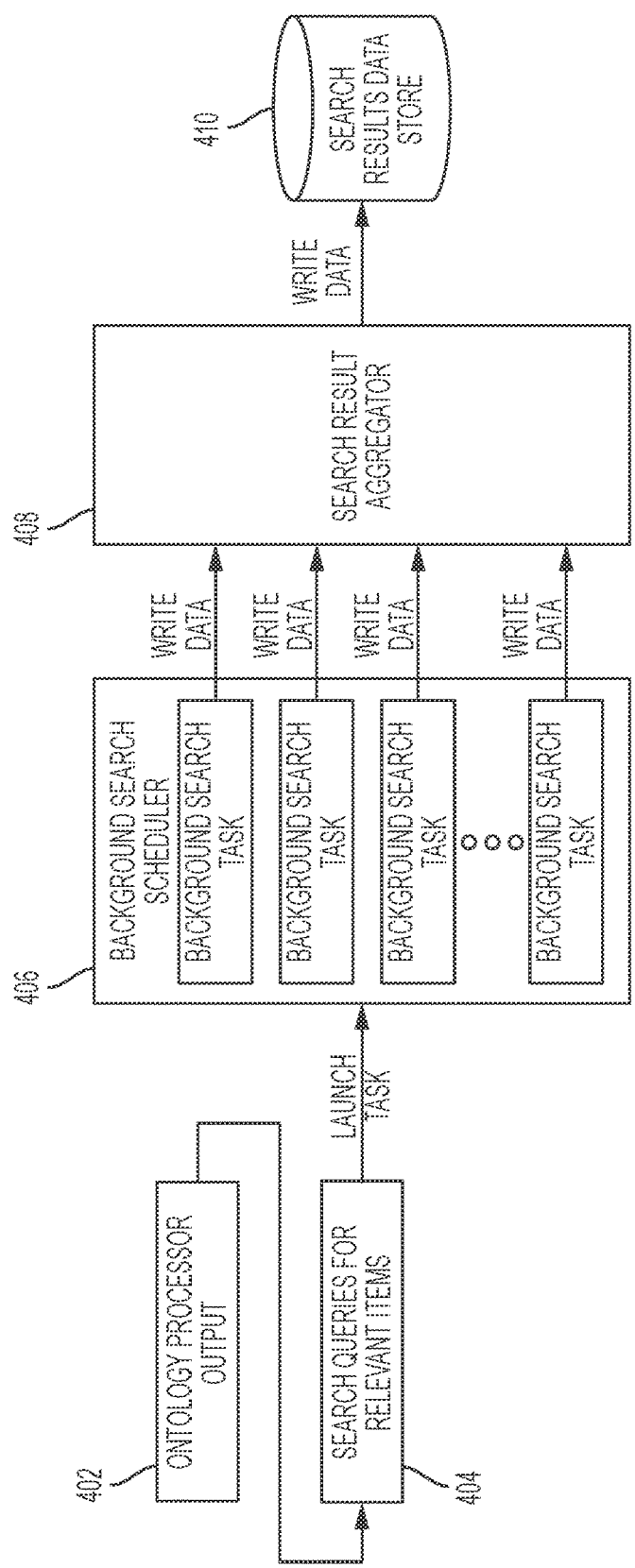
FIG. 4 illustrates components and a real-time background process performing automatic search in one embodiment of the present disclosure.

FIG. 4 further illustrates components and a real-time background process performing automatic search in one embodiment of the present disclosure. The components may execute on one or more hardware processors. The ontology processor output 402 is generated into search queries for relevant items at 404. The ontology processor 304 in one embodiment may construct search queries and dispatch to a background search scheduler. The search queries may be launched, for example, as a computer executable process, for example, scheduled into a background search scheduler 406 for execution. A search result aggregator 408 may aggregate the results output by the search processes 408. The aggregation processing may include collating related results. For example, the results may be collated by criteria such as concept, domain, Uniform Resource Locator (URL), and/or others. The aggregated results may be stored as a search results data store in a storage device 410.

Figure 7:
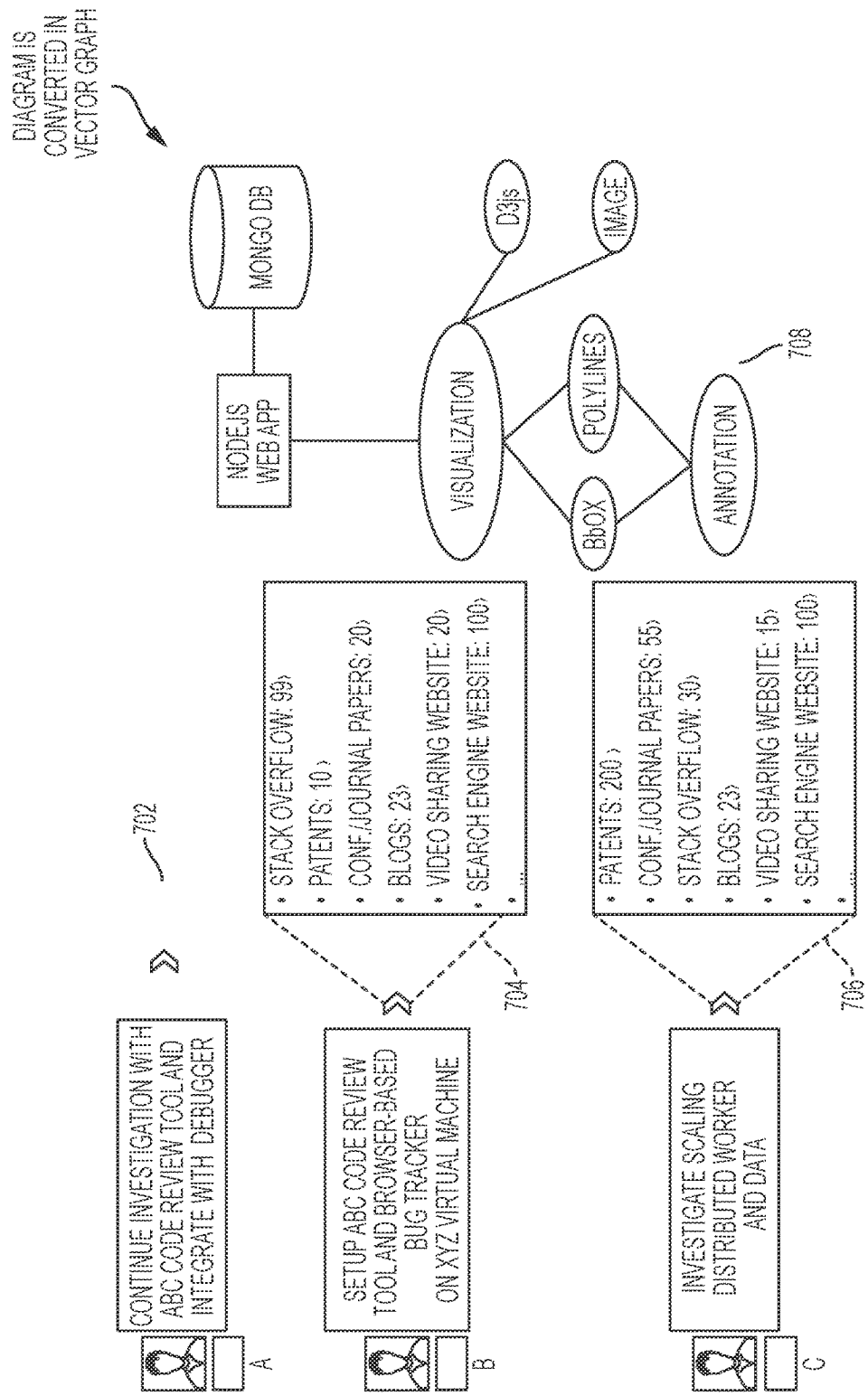
FIG. 7 shows an example output providing a result-set in one embodiment of the present disclosure.

FIG. 6 shows an example of a surface, for example, a whiteboard, on which project collaborators may write in discussing the project, for example, project planning and/or scoping. For example, a user may write content such as a list of entries and a diagram on a surface as shown at 602 and 604. From this image (e.g., captured by an image capture device), the system of the present disclosure in one embodiment may extract and identify keywords to search on, and perform a background search operation. Findings are collated. FIG. 7 shows an example output providing a result-set in one embodiment of the present disclosure. An example of a result-set, may include, but is not limited to, the following items: List of task with assigned member 702, 704, 706; List of extracted keywords associated with each task and relevant search results (e.g., visually marked/identified); Extracted diagram and relevant annotation and search results 708. During the process of digitizing a diagram into a vector form, any found features (e.g., Labels) may be incorporated into the input ontology.

In one embodiment, the system is able to continuously capture input data from the apparatus and camera, in order to continuously update and refine the background search operation for relevant/tailored resources, for example, on the internet. In one embodiment, the system may also keep a log of changes in the captured images for later reference. In one embodiment, the system may present or display found resources through a user interface. In one embodiment, found items are visually linked to the extracted items on the original input data and image. In one embodiment, the system may further allow the users to add additional keywords/annotations associated with each of the extracted items to improve the automated search results and associated machine-learning algorithms. In one embodiment, the machine-learning algorithms are used to continuously to improve both the search criteria and to better tailor and associate the domain expertise of the collaborators with that of the most appropriate search results.

Figure 5:
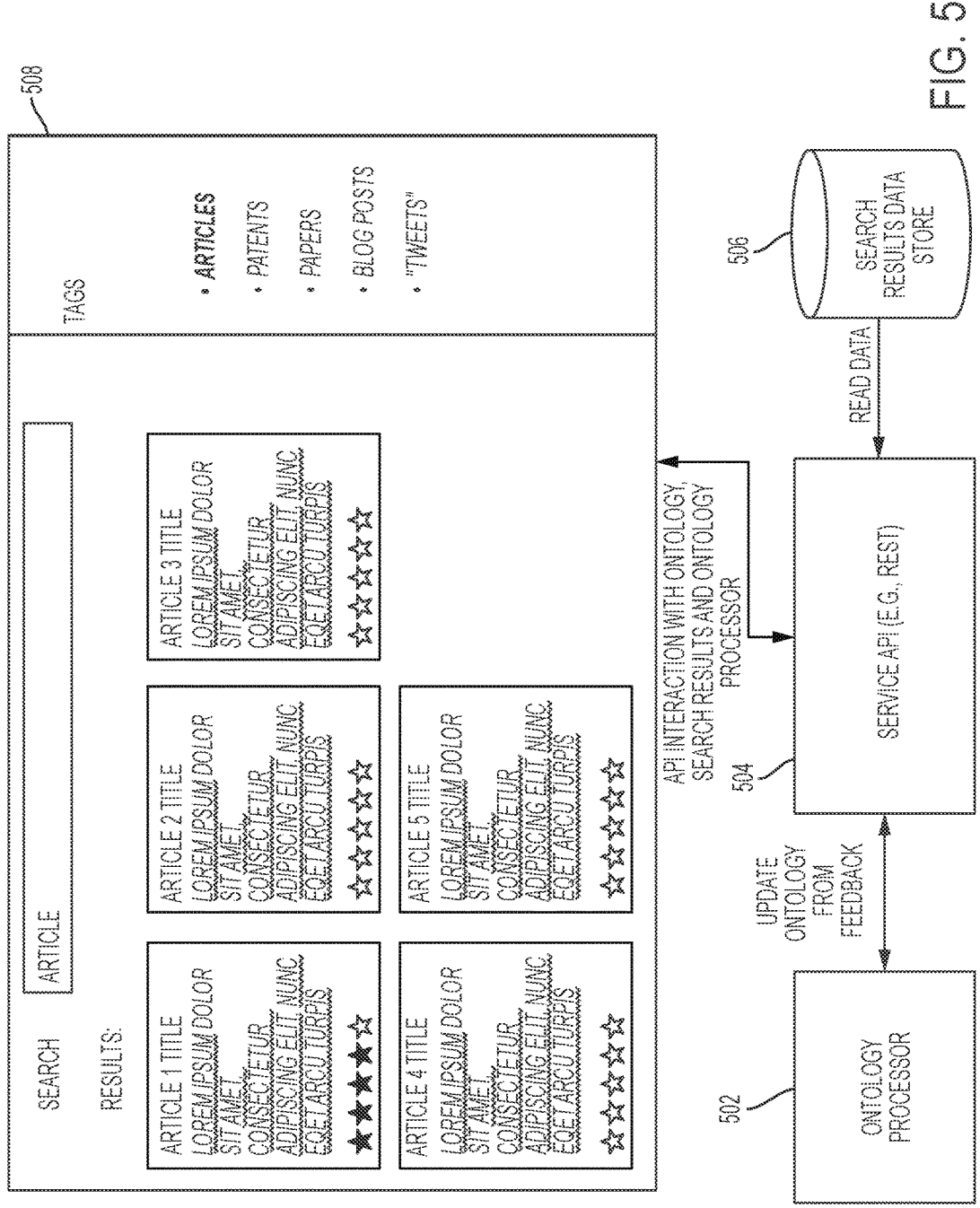
FIG. 5 illustrates components and process of a user interface and feedback mechanism in one embodiment of the present disclosure.

FIG. 5 illustrates components and process of a user interface and feedback mechanism in one embodiment of the present disclosure. In one embodiment, a user interface 508 is provided that allows a user to rate result items. The user ratings in one embodiment are used as contributions by the system to trigger, refine and improve further search actions. In one embodiment, user feedback associated with results is stored in an evolving ontology store 506, for example, a graph database. A service API 504 mediates the user feedback and results associations, as well as interacting with the ontology processor 502 to trigger new search tasks based on user feedback of existing search result items. The system in one embodiment is able to communicate the results of any subsequent processing through either the same medium that was used as a data input source, or other appropriate delivery method, and for example, automatically determine the appropriate delivery mechanism based on pre-defined rules, or other algorithms. As an example of a use-case scenario, consider that a user is looking at returned search results from the system, for example, as shown at 508. After investigating the returned links, the user can use the convenient "star" rating mechanism to provide feedback to the system via the service API (e.g., Using Representational State Transfer (REST) API). The feedback can automatically trigger adjusting of the weights of edges within the input ontology graph, and automatically trigger subsequent searches. These new search results will get incorporated into the user interface via the service API 504 of the front-end application (e.g., 508). In this way, an autonomous control system of continuously learning to generate and improve search queries and executing the search queries may be provided.

Figure 8:
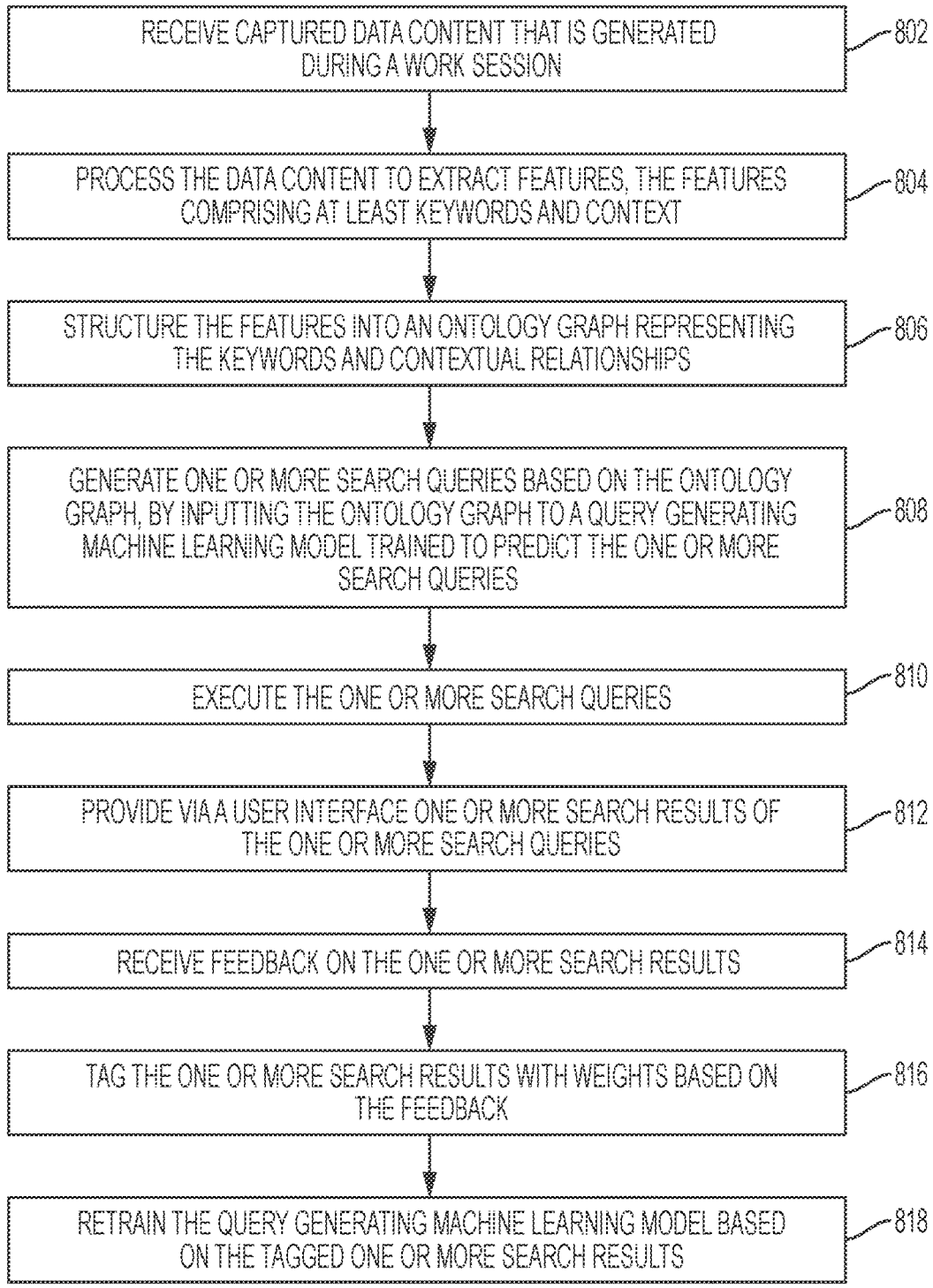
FIG. 8 is a flow diagram illustrating a method of the present disclosure in one embodiment.

FIG. 8 is a flow diagram illustrating a method of the present disclosure in one embodiment. The method in one embodiment automatically captures information and performs content searching. The method in one embodiment is performed by one or more processors. At 802, captured data content that is generated during a work session is received. For example, a mobile device captures the data content, the mobile device taking an image of the data content written on an object surface. An example of the object surface may be a whiteboard. The image of the data content may be analyzed to extract information. Examples of extract information may include, but are not limited to, text from the image, flow diagram from the image, picture from image, list from image, location-based information, inference from text, inferred context of project data, or history of changes, or a combination thereof. In another aspect, the data content may be received from one or more of an online collaboration tool, an audio device, a social network server, a communication server, or a combination thereof.

At 804, the data content is extracted to extract features. The features may include, but are not limited to, keywords and context.

At 806, the features are structured into an ontology graph representing the keywords and contextual relationships.

At 808, one or more search queries are generated based on the ontology graph, for example, by inputting the ontology graph to a query generating machine learning model trained to predict the one or more search queries.

At 810, the one or more search queries are executed. For example, as described above, one or more processors may initiate executing or execute a search engine to perform the search queries. One or more processors may run in real-time, background processes that generate the search queries based on the ontology graph and execute the search queries. The search, for example, performed on the Internet.

At 812, one or more search results of the one or more search queries may be transmitted to a user interface device to present via a user interface one or more search results of the one or more search queries. For example, the user interface may present one or more search results linked to the extracted information from the content data.

At 814, feedback on the one or more search results may be received. For instance, a user may provide a feedback via the user interface that presented the search results. Other methods may be employed to receive feedback.

At 816, one or more search results are tagged with weights based on the feedback.

At 818, the query generating machine learning model is retrained based on the tagged or weighted search results. In one aspect, training of the query generating machine learning model, for example, may be continuous in this way, wherein the retrained query generating machine learning model outputs improved search queries, whose results are tagged or weighted based on feedback and input to a machine learning algorithm to retrain the query generating machine learning model.

Figure 9:
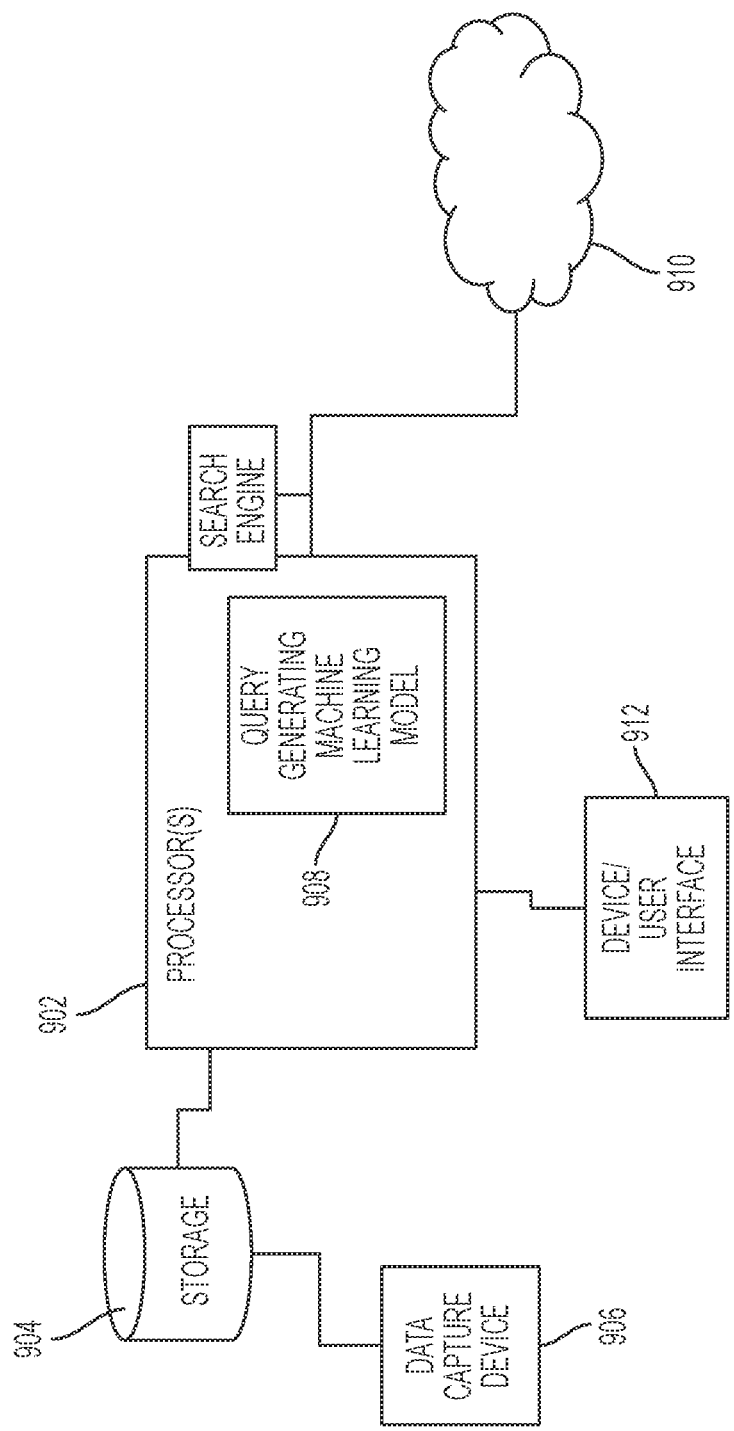
FIG. 9 is a diagram illustrating system components in one embodiment of the present disclosure.

FIG. 9 is a diagram illustrating system components in one embodiment of the present disclosure. A system of automatically capturing information and performing content searching. One or more processors 902 may be coupled to one or more storage devices 904. One or more of the hardware processors may receive captured data content that is generated during a work session and stored in the storage device. For example, in one embodiment, the data content is captured by a mobile device or another device 906, processed and stored in one or more storage devices 904.

One or more of the hardware processors 902 may process the data content to extract features. The features may include at least keywords and context. One or more of the hardware processors 902 may structure the features into an ontology graph representing the keywords and contextual relationships. One or more of the hardware processors 902 may generate one or more search queries based on the ontology graph. For example, the ontology graph may be input to a query generating machine learning model 908 trained to predict the one or more search queries. One or more of the hardware processors 902 may execute the one or more search queries, for example, invoke a search engine to perform the search queries, for example, over a network 910. One or more of the hardware processors may provide via a user interface the search results obtained from the search queries. One or more of the hardware processors 902 may receive feedback on the one or more search results. For example, the search results may be provided via a user interface running on the same device that captured the data content, for example, data capture device 906. In another aspect, the search results may be provided via a user interface associated with another user device 912.

One or more of the hardware processors 902 may tag the one or more search results with weights based on the feedback, and retrain the query generating machine learning model 908 based on the tagged one or more search results.

Figure 10:
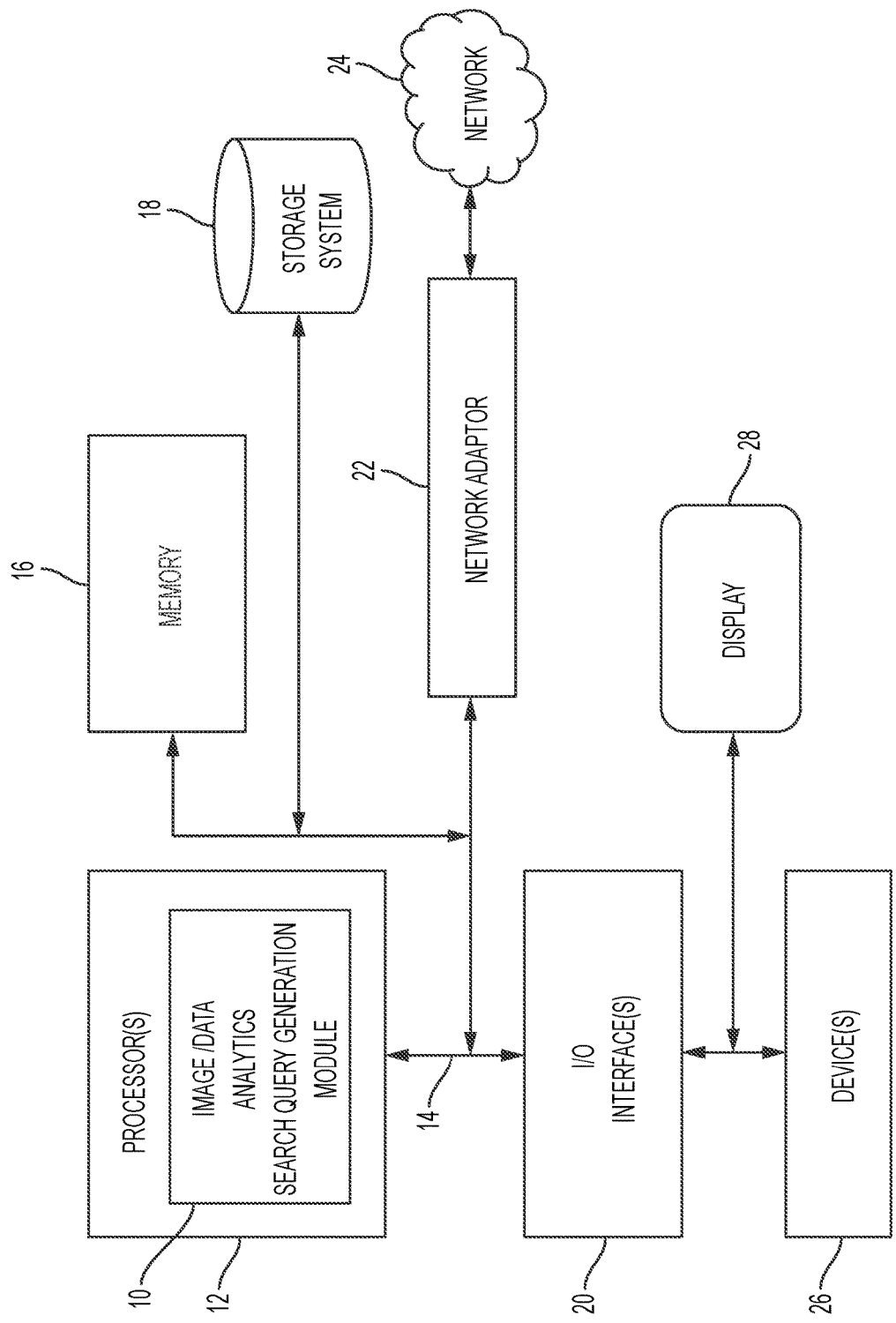
FIG. 10 illustrates a schematic of an example computer or processing system that may implement a system in one embodiment of the present disclosure.

FIG. 10 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of automatically capturing information and performing content searching, the method performed by one or more processors, comprising:
    receiving captured data content that is generated during a work session;
    processing the data content to extract features, the features comprising at least keywords and context;
    structuring the features into an ontology graph representing the keywords and contextual relationships, by creating the ontology graph comprising a plurality of nodes and edges connecting the nodes, a node in the plurality of nodes assigned a weighted feature determined based on a frequency of occurrence of a keyword represented by the node in the captured data content, and an edge connecting two nodes of the plurality of nodes being assigned a weighted feature determined based on at least one of: a frequency of keywords represented by the two nodes appearing together in the captured data content, and a pixel distance between the keywords represented by the two nodes appearing in the captured data comprising an image;
    generating one or more search queries based on the ontology graph, by inputting the ontology graph to a query generating machine learning model trained to predict the one or more search queries;
    executing the one or more search queries;
    providing via a user interface one or more search results of the one or more search queries;
    receiving feedback on the one or more search results;
    tagging the one or more search results with weights based on the feedback; and
    retraining the query generating machine learning model based on the tagged one or more search results.

2. The method of claim 1, wherein a mobile device captures the data content, the mobile device taking an image of the data content written on an object surface.

3. The method of claim 2, wherein the object surface comprises a whiteboard.

4. The method of claim 2, wherein the image of the data content is analyzed to extract information comprising text from the image, flow diagram from the image, picture from image, list from image, location-based information, inference from text, inferred context of project data, or history of changes, or a combination thereof.

5. The method of claim 4, wherein the providing via a user interface one or more search results of the one or more search queries comprises presenting on the user interface the one or more search results linked to the extracted information from the content data.

6. The method of claim 1, wherein the data content is received from one or more of an online collaboration tool, an audio device, a social network server, a communication server, or a combination thereof.

7. The method of claim 1, wherein the generating one or more search queries based on the ontology graph and executing the one or more search queries are executed by one or more of the processors as background processes in real-time.

8. The method of claim 1, wherein the executing the one or more search queries comprises executing the one or more search queries over the Internet.

9. A computer readable storage medium storing a program of instructions executable by a machine to perform a method of automatically capturing information and performing content searching, the method comprising:
receiving captured data content that is generated during a work session;
processing the data content to extract features, the features comprising at least keywords and context;
structuring the features into an ontology graph representing the keywords and contextual relationships, by creating the ontology graph comprising a plurality of nodes and edges connecting the nodes, a node in the plurality of nodes assigned a weighted feature determined based on a frequency of occurrence of a keyword represented by the node in the captured data content, and an edge connecting two nodes of the plurality of nodes being assigned a weighted feature determined based on at least one of: a frequency of keywords represented by the two nodes appearing together in the captured data content, and a pixel distance between the keywords represented by the two nodes appearing in the captured data comprising an image;
generating one or more search queries based on the ontology graph, by inputting the ontology graph to a query generating machine learning model trained to predict the one or more search queries;
executing the one or more search queries;
providing via a user interface one or more search results of the one or more search queries;
receiving feedback on the one or more search results;
tagging the one or more search results with weights based on the feedback; and
retraining the query generating machine learning model based on the tagged one or more search results.

10. The computer readable storage medium of claim 9, wherein a mobile device captures the data content, the mobile device taking an image of the data content written on an object surface.

11. The computer readable storage medium of claim 10, wherein the object surface comprises a whiteboard.

12. The computer readable storage medium of claim 10, wherein the image of the data content is analyzed to extract information comprising text from the image, flow diagram from the image, picture from image, list from image, location-based information, inference from text, inferred context of project data, or history of changes, or a combination thereof.

13. The computer readable storage medium of claim 12, wherein the providing via a user interface one or more search results of the one or more search queries comprises presenting on the user interface the one or more search results linked to the extracted information from the content data.

14. The computer readable storage medium of claim 9, wherein the data content is received from one or more of an online collaboration tool, an audio device, a social network server, a communication server, or a combination thereof.

15. The computer readable storage medium of claim 9, wherein the generating one or more search queries based on the ontology graph and executing the one or more search queries are executed by one or more of the processors as background processes in real-time.

16. The computer readable storage medium of claim 9, wherein the executing the one or more search queries comprises executing the one or more search queries over the Internet.

17. A system of automatically capturing information and performing content searching, comprising:
one or more hardware processors coupled to a storage device;
one or more of the hardware processors operable to receive captured data content that is generated during a work session from the storage device,
one or more of the hardware processors further operable to process the data content to extract features, the features comprising at least keywords and context;
one or more of the hardware processors further operable to structure the features into an ontology graph representing the keywords and contextual relationships, by creating the ontology graph comprising a plurality of nodes and edges connecting the nodes, a node in the plurality of nodes assigned a weighted feature determined based on a frequency of occurrence of a keyword represented by the node in the captured data content, and an edge connecting two nodes of the plurality of nodes being assigned a weighted feature determined based on at least one of: a frequency of keywords represented by the two nodes appearing together in the captured data content, and a pixel distance between the keywords represented by the two nodes appearing in the captured data comprising an image,
one or more of the hardware processors further operable to generate one or more search queries based on the ontology graph, by inputting the ontology graph to a query generating machine learning model trained to predict the one or more search queries,
one or more of the hardware processors further operable to execute the one or more search queries,
one or more of the hardware processors further operable to provide via a user interface one or more search results of the one or more search queries,
one or more of the hardware processors further operable to receive feedback on the one or more search results, one or more of the hardware processors further operable to tag the one or more search results with weights based on the feedback, and one or more of the hardware processors further operable to retrain the query generating machine learning model based on the tagged one or more search results.

18. The system of claim 17, wherein a mobile device captures the data content, the mobile device taking an image of the data content written on an object surface comprising a whiteboard, the image of the data content analyzed to extract information comprising text from the image, flow diagram from the image, picture from image, list from image, location-based information, inference from text, inferred context of project data, or history of changes, or a combination thereof, the user interface presenting the one or more search results linked to the extracted information from the content data.

19. The system of claim 17, wherein the data content is received from one or more of an online collaboration tool, an audio device, a social network server, a communication server, or a combination thereof.

20. The system of claim 17, wherein one or more of the hardware processors generates the one or more search queries and causes execution of the one or more search queries as background processes in real-time.

* * * * *